(12) United States Patent
Bhojwani et al.

(10) Patent No.: US 11,157,990 B2
(45) Date of Patent: Oct. 26, 2021

(54) METHODS AND APPARATUS FOR STORING AND ACCESSING VENDOR MASTER DATA RECORDS IN A CLOUD NETWORK VIA A PROXY VENDOR SYSTEM

(71) Applicant: SAP SE, Walldorf (DE)

(72) Inventors: Sudhir Bhojwani, Mountain View, CA (US); Sanish Mondkar, San Francisco, CA (US); Joseph Fox, Concord, CA (US); Yuan Tung, Fremont, CA (US); Matthew Cromar, Mill Valley, CA (US); Grace Zhang, Los Gatos, CA (US); Steven Weigand, Fresno, CA (US); Rajanikanth Jayaseelan, Sunnyvale, CA (US); Sandeep Chakravarty, Santa Clara, CA (US); Sudha Lakshman, Sunnyvale, CA (US)

(73) Assignee: SAP SE, Walldorf (DE)

( * ) Notice: Subject to any disclaimer, the term of this patent is extended or adjusted under 35 U.S.C. 154(b) by 914 days.

(21) Appl. No.: 15/171,398

(22) Filed: Jun. 2, 2016

(65) Prior Publication Data

US 2016/0328782 A1 Nov. 10, 2016
US 2018/0253781 A9 Sep. 6, 2018

Related U.S. Application Data

(63) Continuation-in-part of application No. 14/725,471, filed on May 29, 2015, now abandoned.
(Continued)

(51) Int. Cl.
*G06Q 30/06* (2012.01)
*G06Q 10/06* (2012.01)
(Continued)

(52) U.S. Cl.
CPC ..... *G06Q 30/0635* (2013.01); *G06F 16/9535* (2019.01); *G06Q 10/06315* (2013.01); *G06Q 30/0603* (2013.01); *H04L 67/10* (2013.01)

(58) Field of Classification Search
None
See application file for complete search history.

(56) References Cited

U.S. PATENT DOCUMENTS

| 9,652,536 B1 * | 5/2017 | Stasior | G06F 16/951 |
| 2006/0173751 A1 * | 8/2006 | Schwarze | G06Q 30/0623 |
| | | | 705/26.61 |

(Continued)

FOREIGN PATENT DOCUMENTS

WO WO-2020150277 A1 * 7/2020 ......... G06Q 30/0603

OTHER PUBLICATIONS

Lohse, Gerald L., and Peter Spiller. "Electronic shopping." 1998. Communications of the ACM 41, No. 7, pp. 81-87. (Year: 1998).*

*Primary Examiner* — Amanda Gurski
(74) *Attorney, Agent, or Firm* — Fountainhead Law Group P.C.

(57) ABSTRACT

The embodiments in this disclosure include a system for receiving search requests for one or more items from a client device having access to a local database that stores primary catalogs containing items of contracted entities. If the items are not found in the primary catalogs, the system may be configured to execute an API for processing the search request by routing the search request to a proxy vendor computer in a cloud network. The cloud network may be configured to store vendor master records for one or more non-contracted entities. The proxy vendor computer can conduct a text search of secondary catalogs associated with non-contracted entities, and can transmit search results to the client device for the requested items. The items may correspond to one or more vendor master records associated with
(Continued)

a non-contracted entity and may have a matching entry in one or more of the secondary catalogs.

21 Claims, 10 Drawing Sheets

Related U.S. Application Data

(60) Provisional application No. 62/005,856, filed on May 30, 2014.

(51) Int. Cl.
*G06F 16/9535* (2019.01)
*H04L 29/08* (2006.01)

(56) References Cited

U.S. PATENT DOCUMENTS

| | | | | |
|---|---|---|---|---|
| 2006/0218052 A1* | 9/2006 | Haynes | ................ | G06Q 50/188 |
| | | | | 705/26.61 |
| 2012/0143725 A1* | 6/2012 | Hutchinson | ........ | G06Q 30/0625 |
| | | | | 705/26.62 |
| 2014/0365348 A1* | 12/2014 | Ballaro | .............. | G06Q 30/0601 |
| | | | | 705/30 |

* cited by examiner

METHODS AND APPARATUS FOR STORING AND ACCESSING VENDOR MASTER DATA RECORDS IN A CLOUD NETWORK VIA A PROXY VENDOR SYSTEM

CROSS-REFERENCE TO RELATED APPLICATIONS

This application is a continuation in part of U.S. application Ser. No. 14/725,471, entitled "Methods and Apparatus for Processing Catalog Spot Buys," filed on May 29, 2015, which claims priority to U.S. Provisional Application No. 62/005,856, entitled "Catalog Spot Buying," filed on May 30, 2014, each of which is incorporated by reference herein in its entirety.

TECHNICAL FIELD

The present disclosure relates to methods and apparatus for searching for items in a cloud-based network, and in particular to methods and apparatus for maintaining and searching for items associated with vendor master records in a database in a cloud network.

BACKGROUND

Businesses may use computer applications to implement business-defined procurement or buying processes for purchases from various catalogs. Procurement applications can provide ways for business users to find items from a catalog and to follow a procurement process for completing a purchase. Conventionally, these procurement processes utilizing catalogs are focused on the biggest chunk of total spend with contracted suppliers and are not optimized for procurement processes related to non-contracted catalog purchases.

Large enterprises use procurement applications offered by vendors to implement policies that govern how catalog-based items are bought on behalf of the company. These applications provide ways for business users to find items from catalogs. These catalogs come from preferred vendors and are approved by the procurement department in advance of any purchase. The procurement department enables the strategic catalogs from a set of preferred suppliers and vendors. The procurement department can then source these catalogs based on past demand and other criteria.

But business users have business needs that involve ad-hoc, one-time purchases. Procurement departments do not strategically source such items because their need is not known beforehand or there is a low return on investment to support investing time and resources in sourcing such purchases. The end result is that ad-hoc, one-time purchases may not follow a company's defined procurement or buying processes. Furthermore, business users have to follow one process to purchase items from catalog under contract and a different process to purchase items out of contract. This often results in confusion, poor buying experience for business users, and can cause a procurement department to have low or no visibility into spot buy spending from non-contracted catalog suppliers. These one-time, ad-hoc purchases are also referred to as "spot buys" in this disclosure.

One of the main problems associated with spot buys is low return on investment for a procurement department to source one-time, ad-hoc catalog items. These procurements are unpredictable; hence, procurement departments may not be able to decide and define a sourcing strategy beforehand. A procurement department may instead focus on strategically sourcing items that they know beforehand that the company may buy as part of operations and sales.

In the absence of a well-defined business process, business users may fulfill their ad-hoc needs in various ways. A business user may submit a request to the procurement department to buy on their behalf. The procurement department has to fulfill this need by spending time and resources on random, arbitrary, and one-time needs. Alternatively, a business user may purchase items online or at a retailer and expense the purchase later. A business user may also make the purchase and not expense the item.

SUMMARY

The embodiments described herein include improved methods, systems and computer readable media for improving processing spot buys by integrating contract and non-contract based catalog processes.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

DETAILED DESCRIPTION

Figure 1:
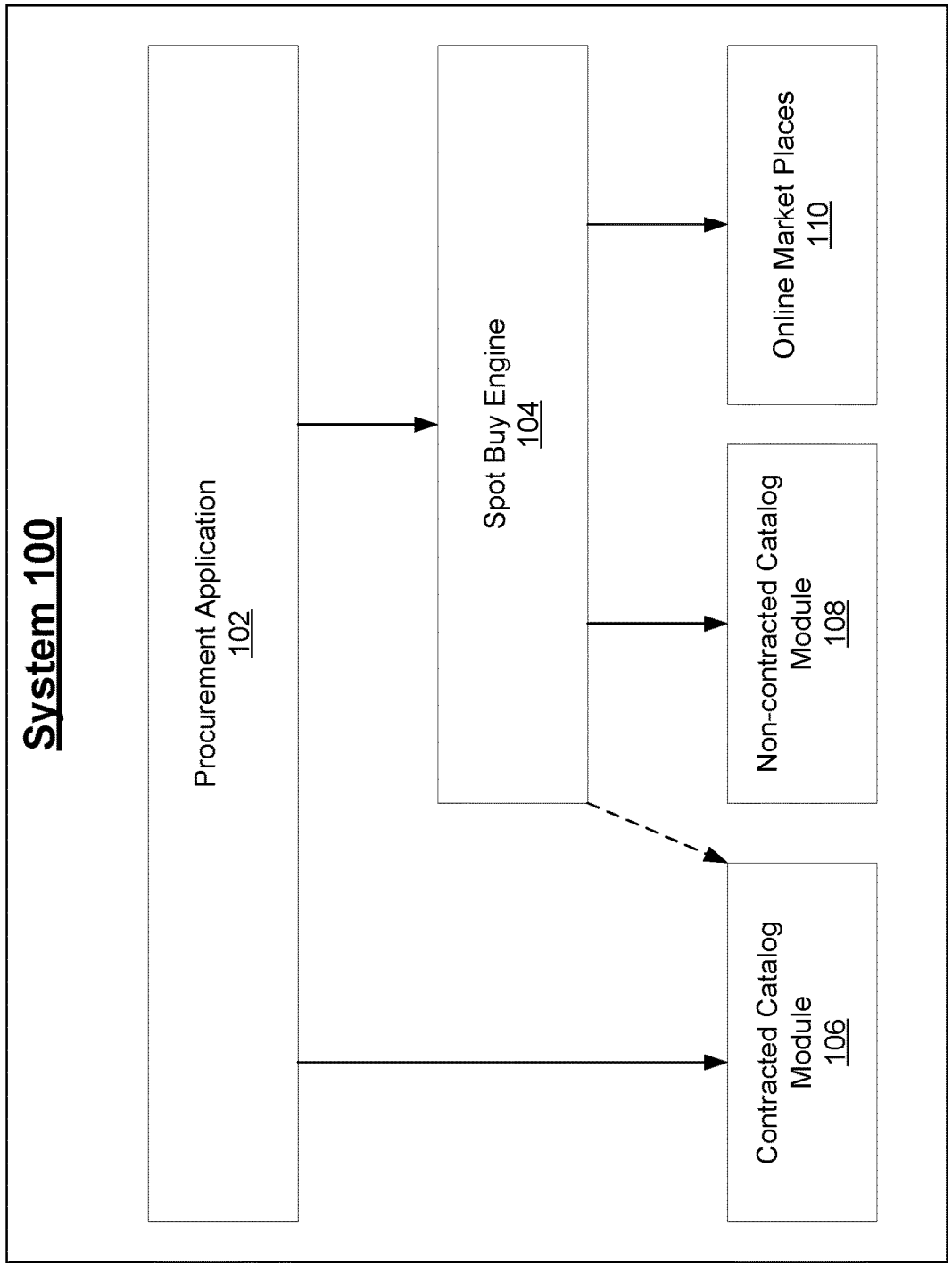
FIG. 1 illustrates a conceptual block diagram of an example embodiment of a system for spot buy purchasing according to the techniques described in this disclosure.

Throughout the description, for the purposes of explanation, numerous specific details are set forth in order to provide a thorough understanding of the present disclosure. It will be apparent to one skilled in the art, however, that the techniques described in this disclosure may be practiced without some of these specific details. In other instances, well-known structures and devices may be shown in block diagram form to avoid obscuring the principles and techniques described in this disclosure.

The disclosed embodiments provide for improved methods, systems and computer readable media for spot buy processing by integrating contract and non-contract based catalog processes together in one or more networks. The techniques described in this disclosure can be adapted to provide better matching of demand and procurement with supplier capabilities and capacity.

In a preferred embodiment, a proxy vendor system of a spot buy engine may be integrated with the system via one or more networks. The proxy vendor system may be in communication with one or more databases in the network that are configured to store a potentially limitless number of vendor master records for vendors for access by the network. In at least certain embodiments, the vendor master records for vendors include information about vendors that supply products and/or services to an enterprise or organization. This information is stored in individual vendor master records. A vendor master record may contain general information relating to a vendor such as the vendor's name and address. The vendor master records may also include, for example, purchasing information for a vendor, types of products and/or services provided by the vendor, terms of payment of the vendor, the currency used for ordering from the vendor, the names of important contact persons at the vendor (e.g., sales staff), as well as accounting information, shipping details, company codes, and payment reconciliation information for the vendor, etc.

This network-based proxy vendor system may be configured to store the vendor master records at one or more nodes of the network in communication with the system and may be accessible potentially across all customers using the system. Among the many advantages of utilizing such a proxy vendor system, one specific advantage is that it allows users to pull out vendor master records from their own database systems and store, manage, and track the vendor master records in the cloud. In the cloud, for example, the vendor records may be generated once for everyone, and the vendor data associated with that vendor is potentially accessible by any other subsequent customer seeking to purchase from the same vendor. This can greatly simplify vendor management for a variety of different customer procurement systems and different procurement system types. A customer can purchase from a potentially limitless number of vendors on a spot-buy basis without having to maintain or administer the vendor master records for each vendor, and without having to store all of the customer's vendor master records in its own database system. This is a new approach to managing the vendor in the relationship between buyers and sellers.

In addition, customers using the spot buy system described in this disclosure are not only able to search a supplier directory and hosted catalog content within their catalog database, but can also search for items from any of number vendors and e-marketplaces, such as eBay® for example, add those items to a shopping cart, and the order processing, vendor management, shipping details, and payment reconciliation can all be provided by the backend system.

I. Exemplary Systems

Provided below is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

FIG. 1 illustrates a conceptual block diagram of an example embodiment of a system for spot purchases according to the techniques described in this disclosure. In the illustrated embodiment, system 100 comprises a procurement application 102, a spot buy engine 104, a contracted catalog module 106, a non-contracted catalog module 108, and one or more online market places 110 in communication with the system over one or more networks (not shown). In various embodiments, procurement application 102 includes processes that allow contracted catalog 106 and non-contracted catalog 108 to be integrated into the same system based on a set of policies. The policies may include regional policies, departmental policies, user-level policies, category-level policies, or any combination thereof. These policies can be defined for various reasons including existing relationships with preferred vendors, category goals, company goals, or company policies, etc.

For example, a company has sourced an information technology (IT) accessories catalog in the United States, but the company lacks the resources to generate an equivalent catalog for its branches in other countries. The company can define a policy that allows users outside of the United States to purchase IT accessories from any non-preferred vendor. In another example, a company may have strong relationships with a vendor in specific category (e.g., maintenance, repair and operations ("MRO")). Business users may be required to buy MRO items from the preferred vendor to optimize pricing. However, the company may not have strong relationship in other categories, such as office supplies, for example. System 100 may provide these companies with the option of using other (e.g., non-preferred) vendors for supplying such items.

This may be accomplished, in one embodiment by integrating the contracted catalog module 106 vendors and the non-contracted catalog module 108 vendors together under control of the procurement application 102. The procurement application 102 may work in a functionally coordinated manner with the spot buy engine 104 for this purpose. In one embodiment, the procurement application 102 and the spot buy engine 104 may be integrated together within the system 100. In alternate embodiments, the procurement application 102 and the spot buy engine 104 may comprise separate components or systems.

Although the system 100 is described for procurement of items or products in this description, the system 100 may also be used for procurement of services. The procurement application 102 can process search inquiries for items for purchase (e.g., spot buys or non-spot buys), requisitions the items, orders the items, and returns, etc. The procurement application 102 can process purchases for contracted items in the contracted catalog module 106. In some embodiments, the procurement application 102 may include an index of contracted items and does not need to search the contracted catalog module 106 to make such a purchase.

The procurement application 102 can process spot buys through the spot buy engine 104. The spot buy engine 104 may also be configured to integrate a number of online marketplaces 110 into the system 100 to provide users with an additional channel to purchase items from a potentially limitless number of online vendors. In response to requests for non-cataloged items, the spot buy engine 104 can process the requests through non-contracted catalog module 108 or in the online market places 110. Spot buy engine 104 may communicate with contracted catalog module 106 to procure items or add items to the contracted catalog 106.

Figure 2:
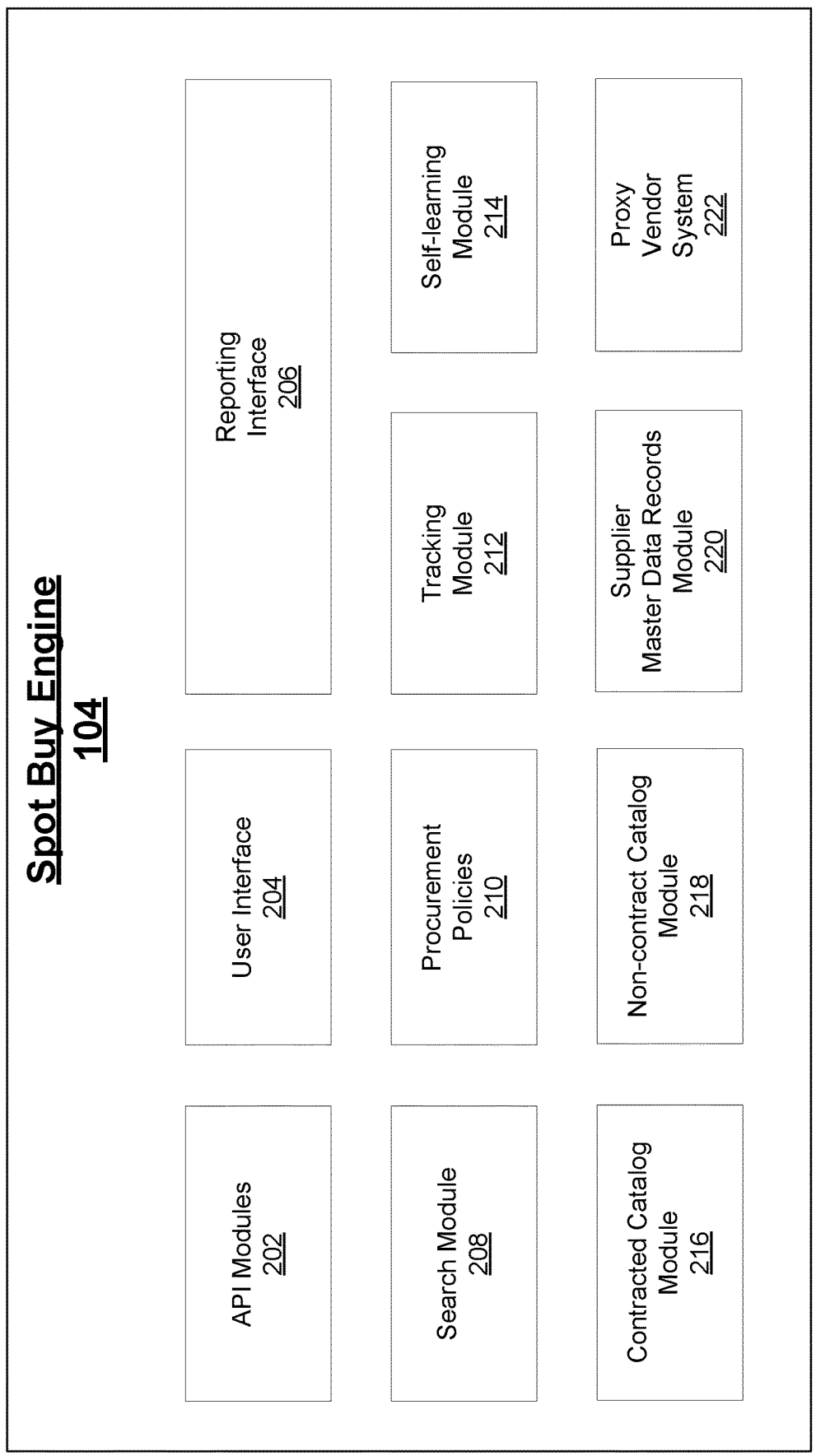
FIG. 2 illustrates a conceptual block diagram of an example embodiment of a spot buy engine adapted for spot buy purchasing according to the techniques described in this disclosure.

The embodiments described herein include improved methods, systems and computer readable media for improving processing spot buys. In one embodiment, this may be accomplished by integrating contract and non-contract based catalog processes. FIG. 2 illustrates a conceptual block diagram of an example embodiment of a spot buy engine adapted for spot buy purchasing according to the techniques described in this disclosure. In the illustrated embodiment, the spot buy engine 104 comprises an application programming interface ("API") 202, a user interface module 204, a reporting interface module 206, a search module 208, a procurement policies module 210, a tracking module 212, a self-learning module 214, a non-contract catalog 216, a contract catalog 218, and a supplier master data module 220. Although the components of the spot buy engine 104 are depicted in a certain configuration, it should be understood that these components are not limited to any particular arrangement or configuration. The API(s) 202 may include APIs for the process of spot buy engine 104. The various embodiments of certain of these APIs are described below with reference to FIGS. 4-7.

User interface 204 may be a user interface adapted to provide information to help users select the best items or products based on various criteria. The criteria may include, for example, experience of other users from the user's company buying the same item from the non-preferred vendor, experience of other users from other companies with the non-preferred vendor, or experience of other business users of the system 100. Various of these user interfaces 204 (such as search results page and confirmation pages) are used in the flows described below with reference to FIGS. 4-7.

The reporting interface module 206 may comprise a user interface that provides reports to a user, agent, or management of information related to spot buys, such as search metrics or procurement metrics. The search module 208 may be configured to process search queries of spot buys from users and to generate search results that are provided to user interface 204 for communication with the user. Search module 208 may include a relevance engine (not shown) that sorts the search result based on defined rules.

In certain situations, the relevance engine may be configured to direct business users (from a specific company) to items from a specific seller. For example, if a company has not sourced a certain item (e.g., mobile device cases), and business users can purchase the device cases from many vendors, the relevance engine can detect over a period of time that the mobile device cases are being purchased from a particular seller by business users of the company. The relevance engine can adjust the search results to make this particular seller's content more relevant in the search results. The end goal may be that this seller, who was not a preferred seller for the company at the outset, is converted into a preferred vendor based on the volume of purchases made over time, which may be tracked by the tracking module 212 and the relevance engine (not shown), and used to promote future search results from that vendor or group of vendors. Further, the relevance engine in conjunction with the tracking module 212 may cause a company to start sourcing mobile device cases from a particular vendor/seller.

The procurement policies module 210 can be adapted to process rules and policies for spot buy purchases. The policies may include regional policies, departmental policies, user level policies, category level policies, or any combination thereof, etc. These policies can be defined for various reasons including existing relationships with preferred vendors, category goals, company goals, or company policies. The policies may define the implementation of search and browsing behavior across the contract catalog module 218 and non-contract catalog module 216. The policies may also be based on existing contracts with preferred vendors, locations, categories (e.g., laptop computers), or users, etc.

The self-learning module 214 can be configured to analyze the tracked activity of tracking module 212 and to determine whether to transition a particular non-contracted item from a particular seller (or sellers) to a contracted item. Self-learning module 214 can federate the catalog items from various non-contracted sources such as online marketplaces and ecommerce retailers, etc.

In a preferred embodiment, a proxy vendor system 222 can be integrated with the system 100. Such a proxy vendor system 222 can be configured to store vendor master records for multiple vendors in a cloud network that can be made accessible potentially across all customers using the system 100. In a cloud network, the vendor master records may be generated once for everyone, and when a particular vendor is added to the system, the vendor profile data associated with that vendor can be accessible by any other subsequent users seeking to purchase from that same vendor at a later time. This can greatly simplify vendor management for a variety of different customer procurement systems and different procurement system types. Customers can purchase from multiple vendors on a spot-buy basis without having to maintain or administer the master data for each vendor, and without having to store all of the customer's vendor master records in the customers' own database systems.

In the illustrated embodiment, the proxy vendor system 222 can be configured to work in conjunction with the supplier master data module 220 to store the vendor master records. The supplier master data module 220 can also be configured to store reference information to the multiple vendors or suppliers from which purchases have been made and tracked over time, and to provide the logic for routing such transactions to the appropriate supplier.

As discussed above, customers using the system described in this disclosure are not only able to search a supplier directory and hosted catalog content within their respective procurement applications, but can also search for items on any of a number of non-contracted catalog content from a variety of sources including e-marketplaces, such as eBay® for example, and can add those items to a shopping cart. In the illustrated embodiment, the contracted catalog module 216 may comprise the contracted catalog module 106, and the non-contract catalog module 218 may comprise the non-contracted catalog module 108 described in FIG. 1.

The spot buy engine 104 can bring contracted and non-contracted purchasing under the same processes of system 100, and in some instances, can integrate them together. This may be facilitated based on policies in the procurement policies module 210. With the non-contract policies under control of system 100, the speed and efficiency of spot buys can be dramatically increased. The system 100 can make it much easier for business users to purchase spot buy content by following the process.

The tracking module 212 can be configured to provide data for a spot buy sourcing strategy to a procurement department. The tracking module 212 can provide data for a procurement department to facilitate better spot buying from non-contracted catalog from preferred vendors as well as non-preferred vendors. The tracking module 212 can be used to detect, record, and track some or all of the activity related to spot buys. The tracked activity can provide visibility into which non-preferred spot buy suppliers should be transitioned into preferred suppliers. The tracked activity can also provide visibility into which categories should be strategically sourced based on purchasing across contract and non-contract purchasing processes.

Figure 3A:
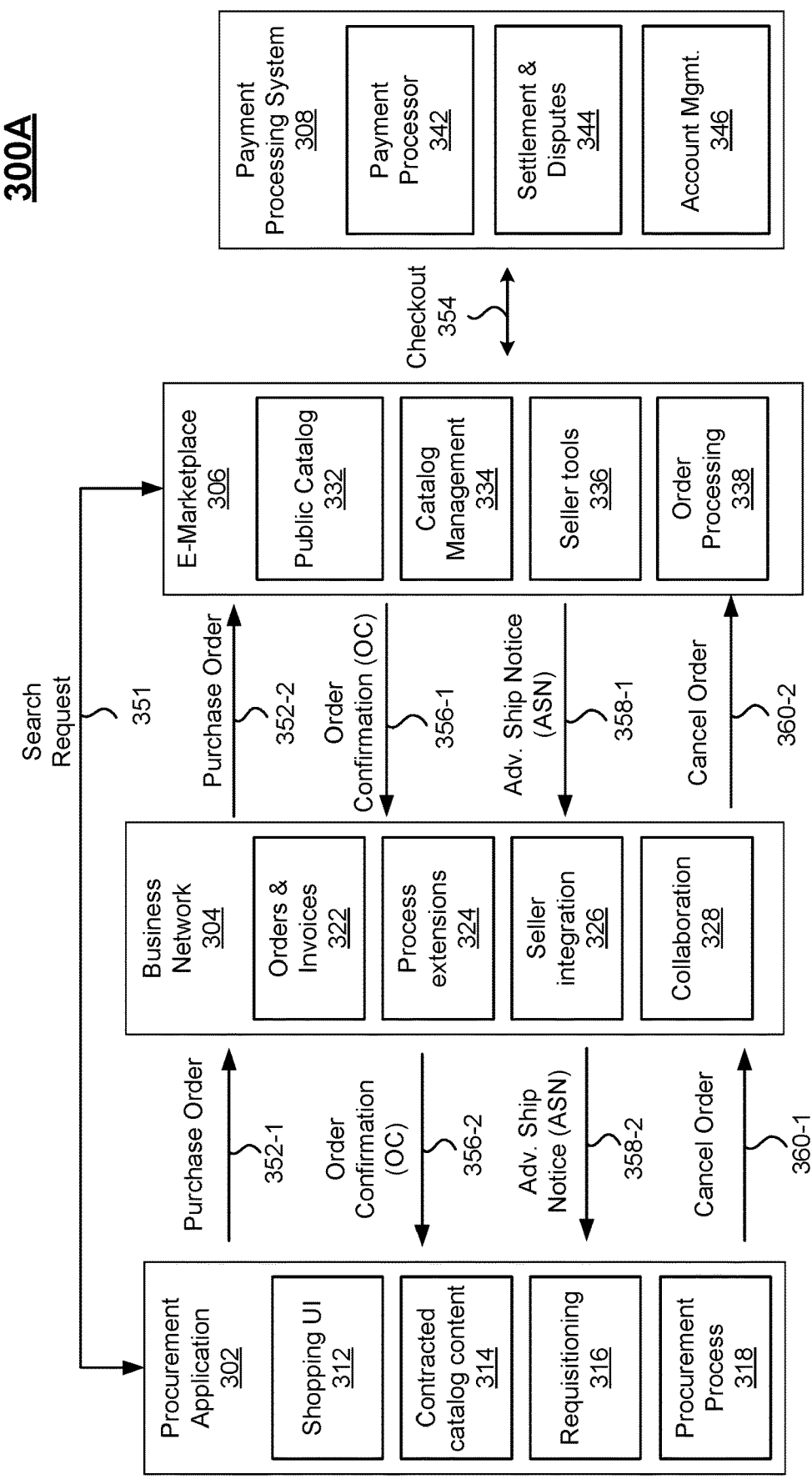
FIG. 3A illustrates a conceptual block diagram of an example embodiment of a system for spot buy purchasing according to the techniques described in this disclosure.

FIG. 3A illustrates a conceptual block diagram of an example embodiment of a system adapted for processing catalog spot buys according to the techniques described in this disclosure. In the illustrated embodiment, the system 300A comprises a procurement application 302, a business network 304, one or more electronic commerce marketplaces (e-marketplaces) 306, and a payment application 308. The procurement application 302 may comprise, for example, the procurement application 102 of FIG. 1, and the system 300A may comprise an example implementation of the system 100 of FIG. 1.

The system 300A may provide spot buy functionality in an enterprise for procurement application users. Users may add non-catalog items to a requisition for a procurement agent to fulfill. The procurement agent may fulfill orders by collaborating with a preferred supplier, or may facilitate purchasing the order on an e-commerce site. The procurement agent may also enter the order details into the system 300A. The system 300A can then generate reports that identify items over time that can be subsequently added to the catalog database.

The e-marketplace 306 may be, for example, an eBay® Marketplace or Amazon® e-marketplace. In this example embodiment, the e-marketplace 306 comprises a public catalog 332, a catalog management module 334, a seller tools module 336, and an order processing module 338. The public catalog 332 may provide a catalog that buyers can use to make purchases from. The catalog management module 334 can process search requests, orders, price requests, and the like for items contained in public catalog 332. The seller tools module 336 can include tools for vendors to manage catalog content, such as updating prices or availability, etc. The order processing module 338 can be adapted to provide capabilities for processing orders, such as payment processing, order routing, canceling orders, dispute management, and the like.

In the illustrated embodiment, a payment processing system 308 is in communication with the e-marketplace 306. The payment processing system 308 can process payment of ordered items as well as process refunds for returned items. The payment processing system 308 may be, for example, an online payment provider, such as PayPal® or Alipay, or other payment processing systems such as those of credit card providers, financial institutions, etc. In this example, the payment processing system 308 includes a payment processor 342, a settlement and disputes module 344, and an account manager 346. The payment processor 342 can process payments for transactions in the e-marketplace 306. The settlement and disputes module 344 can process disputes between buyers and sellers, buyers and payment entities, or sellers and payment entities. The account manager 346 can process information related to users, such as form of payment, shipping address, and preferences. The payment application 308 can process credit cards or other methods of payment, and settlement, and may also handle risk management.

Procurement application 302 may include on-demand or on-premise enterprise applications. These applications provide a buying experience to users and implement a procurement process to perform enterprise buying. In this example, the procurement application 302 comprises a shopping user interface ("UI") 312, a contracted catalog content module 314, a requisitioning module 316, and a processing process module 318. The shopping user interface ("UI") 312 can provide the user with a user interface for accessing item information, order information, and other information for users to search and make one or more spot buys. The contracted catalog content module 314 can then processes content from contracted catalog 218.

In the depicted embodiment, the procurement requisitioning module 316 can be configured to process requisitions from users that request purchase of items, returns, and the like. The requisitioning module 314 may process the requisitions described below in conjunction with FIG. 5. The procurement process module 318 can be configured to process procurement activity in the procurement application 302. The procurement activity may include the processes described below in conjunction with FIGS. 4-7.

The business network 304 can be configured to process extensions to one or more procurement applications 302 for performing business commerce with suppliers. In this embodiment the business network 304 comprises an orders & invoices module 322, a process extensions module 324, a seller integration module 326, and a collaboration module 328. The orders & invoices module 322 can process orders, purchase orders, invoices, requisitions, and returns. In this example, the seller integration module 326 can be adapted to process information—such as stock information, item details and the like—from sellers and to provide the information to the procurement application 302. The collaboration module 328 can process communication between the procurement application 302 and suppliers or vendors to supply a non-catalog item.

The procurement application 302, in at least certain embodiments, can be configured to provide a unified buying experience across items from contracted catalog content 314 and the public catalog 332 of the e-marketplace 306. In some embodiments, public procurement and contracted procurement can be processed by procurement process 318 in the procurement application 302. The procurement application 302 can communicate purchase orders 352-1 to the business network 304, which in response, can communicate the purchase orders 352-2 to the e-marketplace 306. The business network 304 may integrate procurement applications from different entities. In some embodiments, the business network 304 can communicate purchase orders 352-2 to the e-marketplace 306 using a markup language, such as for example, the commerce extensible markup language (cXML).

The procurement application 302 can also receive search requests 351 from users and can communicate the search requests 351 to the e-marketplace 306 to perform a search for items, and return item details, inventory or stock out status, shipping information, seller profile, and the like, to the procurement application 302. The order processing 338 in the e-marketplace 306 can be adapted to handle payment processing via the payment processing system 308 that can include a checkout process 354. The checkout process 354 may be configured for a guest or a registered user. In this example, the e-marketplace 306 provides an order confirmation (OC) 356-1 to the business network 304, which in response thereto, provides an order confirmation (OC) 356-2 to the procurement application 302. The e-marketplace 306 can then provide an advance ship notice (ASN) 358-1 to the business network 304, which in response thereto, can provide an advance ship notice (ASN) 358-2 to the procurement application 302.

For order cancellation, the procurement application 302 can communicate a cancel order request 360-1 to the business network 304, which in response thereto, can provide a cancel order request 360-2 to the e-marketplace 306. The cancellation of an order is described in the data flow diagram depicted in FIG. 7.

In an example setup, a buyer can set up a buyer account in the e-marketplace 306. In some embodiments, this setup can be done manually or automatically. A buyer can set up a buyer account in the payment processing system 308, for example, if the buyer is not using a credit card directly for the purchase. In other examples, a credit card or other payment token can be used to directly make the purchase. An accounting department can setup an account for the user in the procurement application 302. Policies for spot buys may also be setup by the enterprise operating the business network 304 or the procurement application 302.

As discussed above, an example embodiment of the techniques described in this disclosure can be adapted to provide a proxy vendor system configured to store a potentially limitless number of vendor master records for vendors in a network such as a cloud network. This cloud-based proxy vendor system may be configured to store the vendor master records at one or more nodes in communication with the system which may be accessible potentially across all customers using the system with the proxy vendor functionality. A customer can purchase from multiple vendors on a spot-buy basis without having to maintain or administer master data for each vendor, and without having to store all of the customer's vendor master records in its own database system.

Figure 3B:
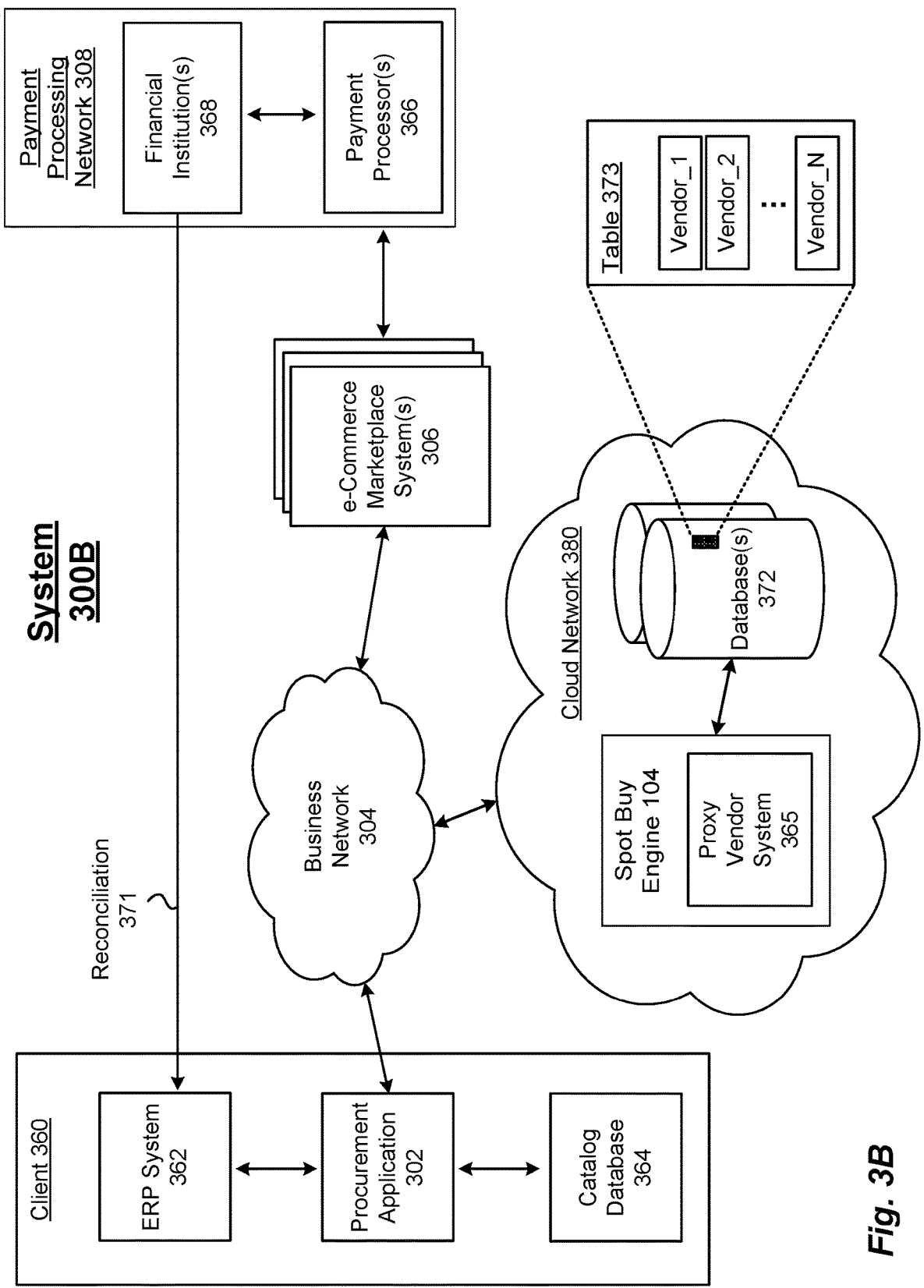
FIG. 3B illustrates a conceptual block diagram of an example embodiment of a system adapted for spot buy purchasing using a proxy vendor system described in the present disclosure.

FIG. 3B illustrates a conceptual block diagram of another example embodiment of a system adapted for spot buy purchasing using a proxy vendor system according to the techniques described in the present disclosure. In the illustrated embodiment, system 300B includes a client system 360 comprising a procurement application 302, a business network 304, one or more e-commerce marketplace systems 306 (e.g., server computers or groups of server computers), a payment processing network 308, and a cloud network 380 comprising a spot buy engine 104 and proxy vendor system 365 in communication with one or more databases 372 in the cloud. The system 300B may provide spot buy functionality in an enterprise for procurement application 302 users.

The client system 360 includes a procurement application 302, an enterprise resource planning ("ERP") system 362, and a catalog database 364. In alternative embodiments, the procurement application 302, the ERP system 362, and the catalog database 364 may be external components from the client 360 and in communication with the client 360 via one or more networks or other communication mediums. For example, the client 360 may access ERP system 362, procurement application 302, and the catalog database 364 remotely via one or more networks, such as for example, the business network 304 or the cloud network 380, or combination thereof.

The client system 360 may communicate with one or more e-commerce marketplace systems 306 via the business network 304 as discussed above with respect to FIG. 3A. The client 360 may also communicate with the cloud network 380 via the business network 304. In the illustrated embodiment, cloud network 380 includes a spot buy engine in communication with one or more databases 372. The spot buy engine 104 includes a proxy vendor system 365. The database(s) 372 of the cloud network 380 may comprise tables 373 configured for storing the vendor master records (e.g., Vendor_1, Vendor_2, . . . Vendor_N).

The embodiments can be configured to store and provide access to the vendor master records in a network, such as a cloud-based network, so that the need for storing and managing the vendor master records at the client system 360 is eliminated. Instead, the vendor master records are stored in the databases 372 once for all clients, and can be accessed, tracked, and managed, using the proxy vendor system 365. Clients 360 can enter searches for spot buy content into ERP system 362 or the procurement application 302, and the procurement application 302 can generate search requests, purchase orders, cancel orders, process returns, and provide seller details and shipping information, etc., based on accessing content via business network 304 and/or cloud network 380.

For procurement, the catalog database of items 364 can first be checked to see if the item is maintained in the catalog database. If not, the procurement application 302 can communicate with the proxy vendor system 365 in the spot buy engine 104 for fulfillment of search requests. The proxy vendor system 365 may search for requested items among the vendor master records stored in the database(s) 372 of the cloud network 380, and may communicate a set of search results for one or more items matching the search requests from one or more of the vendor records stored in the database(s) 372. The procurement application 302 can receive the list of matching items and can display the list of items and associated vendors to users in a graphical display at the client system 360.

A vendor master record can be generated and tracked for every purchase within the integrated system 300B. In one embodiment, the vendors associated with the one or more e-Commerce Marketplace Systems 306 are integrated with the functionality of the proxy vendor system 365 of the spot buy engine 104. Once users add items to be purchased from non-catalog sources to the shopping cart and the procurement is approved, the proxy vendor system 365 can process the order on behalf of the user of the procurement application 302 and can access a list of products and associated vendors from which users can browse and select for purchasing the items. The payment processing network 308 comprising one or more financial institutions 368 and associated payment processors 366 can then process the orders and provide reconciliation information 371 back to the ERP system 362 at the client 360 for settlement.

Accordingly, in at least certain embodiments the clients 360 only need to set up the spot buy engine 104 as the vendor, and all orders for that one vendor can be processed using the system 300B. Generating the list of items for purchase and associated vendors, receiving and processing purchase orders, providing seller details and shipping information, and payment processing, etc., can be processed by the system 300B using the proxy vendor system 365 of the spot buy engine 104.

In the cloud network 380, the vendor master records may be generated once for all users, and when a particular customer adds a new vendor, the vendor data associated with that vendor can be stored as a vendor master record in the system, which can be potentially accessible by any other subsequent client or user seeking to make a purchase from that same vendor. In addition, customers using the system described in this disclosure are not only able to search a supplier directory and hosted catalog content within their procurement application 302, but can also search for items on any of a number of e-marketplaces, and add those items to a shopping cart. Subsequent orders communicated to that particular vendor can thereafter be retrieved from the vendor master records via proxy vendor system 365 in the cloud network 380. Over time, a particular vendor may be added to the contracted catalog content at the client catalog database 364 so that subsequent purchases from that vendor can also be accessed from the contracted catalog content.

In one embodiment, the proxy vendor system 365 may be integrated with the procurement application 302, the spot buy engine 362, and/or the business network 350, or any combination thereof. In other embodiments, the proxy vendor system 365 may be implemented as a separate component in communication with the procurement application 302, the spot buy engine 362, and/or the business network 350. The proxy vendor system 365 may be configured to store a plurality of vendor master data records for vendors in a database 372 either as a component in a cloud network 380 or as a component in communication with the cloud network 380. This proxy vendor system 365 may be accessible across customers using the system 300B. In the cloud network 380, the master vendor records (e.g., Vendor_1, Vendor_2, . . . , Vendor_N) may be generated once for all users. A user/customer can thereafter purchase from a potentially infinite number of vendors on a spot-buy basis without having to maintain or administer master data for each vendor; and without having to store all of the customer's vendor master records in its own database system.

As will be appreciated by persons of skill in the art, network(s) 304 and 380 described in FIG. 3B may be implemented as a single wired or wireless network, or multiple separate networks in communication with one another. Network(s) 304 and 380 may be implemented as any wired or wireless network(s). For example, the networks 304 and 380 described herein can be implemented as a local area network ("LAN"), wide-area network ("WAN"), combination of LANs and WANs, the Internet, or any other type of communication network adapted for communicating electronic messages and information. Further, network(s) 304 and 380 may be implemented as a physical array of hardware resources or as a virtual array, or any combination thereof. Network(s) 304 and 380 may also be implemented in a cloud-based network configuration. For example, network(s) 304 and 380 may be implemented as public or private cloud network, or combination thereof. No specific network or network architecture should be construed as limiting the embodiments and techniques described herein.

Figure 4:
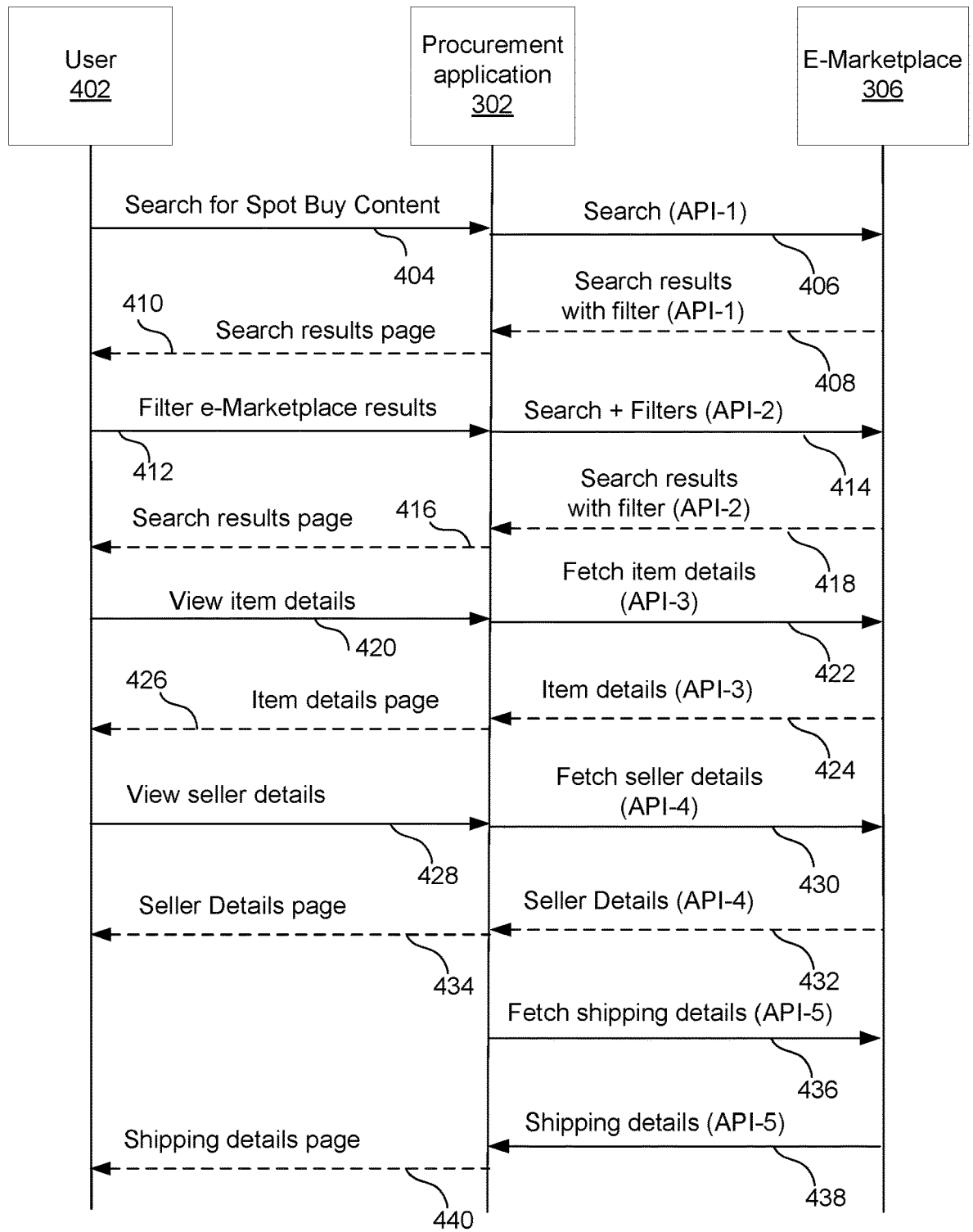
FIG. 4 illustrates a data flow diagram of an example embodiment of a shopping process according to the techniques described in the present disclosure.

FIG. 4 illustrates a data flow diagram of an example embodiment of a shopping process according to the techniques described in the present disclosure. In various embodiments, shopping includes searching, browsing, and filtering. In the illustrated embodiment, a user 402 communicates a search request 404 to procurement application 302 for a search for spot buy content. (The searches of FIG. 4 may include the searches 351 described above.) In this example, in response to the search request 404, procurement application 302 communicates a search request 406 to e-marketplace 306 that executes, for example, a first API (API-1) for the search. The e-marketplace 306 communicates search results with filter 408 that may be generated by the first API to procurement application 302. The procurement application 302 can then communicate a search results page 410 to user 402.

In various embodiments, API-1 provides a free text capability for searches. In some embodiments, the search is restricted to catalog items from quality suppliers. Examples of criteria include top rated supplier, plus some inventory criterion (e.g., available to buy now items only instead of auction items). API can be adapted as a search API that may support pagination via parameters such as "start" and "size" etc. In some embodiments, the search may include additional filtering based on business policies. In one embodiment, the business policies may exclude items from a set of categories from being displayed. In one embodiment, the business policies may omit items from a particular set of suppliers from being displayed, etc. In one embodiment, procurement application 302 communicates a default shipping address of the user 402 to the e-marketplace 306.

The search results may include an identifier, name or title, short description, image, price or lead time of the item. The search results may also include seller name, seller identifier, seller rating, and offer details (e.g., free shipping). The search result may include total search result count. The search result may include filtering options, such as color with options, size with options, manufactures with names, etc.

User 402 can communicate a search request 412 that filters the results of the search of e-marketplace 306 to the procurement application 302 for a search based on the filtered results. In this embodiment, in response to the search request 412, procurement application 302 sends a search request 414 to e-marketplace 306 that executes, for example, a second API (API-2) for the search. The e-marketplace 306 communicates the search results with filter 418 that is generated by API-2 to procurement application 302. Procurement application 302 communicates a search results page 416 to user 402. The search results may further include items to showcase. Further, certain categories can be restricted (e.g., exclude adult content from search results if a user searches for certain words or phrases.

In various embodiments, API-2 may be the same as API-1 (Search), but further including filtering functionality. API-2 may support filtering results further based on user selection. For example, user 402 may request to be shown only yellow colored items.

In the illustrated embodiment, user 402 communicates a view item details request 420 to procurement application 302. In response to the view item details request 420, procurement application 302 communicates a fetch item details request 422 to e-marketplace 306 that executes, for example, a third API (API-3), to fetch the details of the requested item. In the diagram, the e-marketplace 306 communicates the item details 424 to procurement application 302, which in response thereto, provides an items details page 426 to user 402.

In various embodiments, API-3 fetches item details from public catalog 332 (see FIG. 3). API-3 may be called in other instances where a user 402 or a procurement application 302 requests item details. In some embodiments, the call is based on an item identifier. In some embodiments, API-3 receives the default shipping address of user 402 for shipping rate calculation.

In some embodiments, the e-marketplace 306 communicates items details that include item identifier, item name, a description (e.g., full or partial description), images, price, shipping price, taxes, and other details as shown on an item details page 426 of the e-marketplace 306. In some embodiments, the e-marketplace 306 communicates the items details page 426 that includes return policy details with information to print return label as needed, configuration options (e.g., color or, size) that are used to buy the item, and seller metrics (e.g., ratings). In some embodiments, the e-marketplace 306 returns seller details that may include seller identifier, name, address, email, phone, and the like. This additional information supports instances when where the user decides to add the item to the cart for shopping.

In the illustrated embodiment, user 402 communicates a view seller details request 428 to the procurement application 302, and in response thereto, procurement application 302 provides a fetch seller details request 430 to e-marketplace 306 that executes, for example, a fourth API (API-4), to fetch the details of the seller. In this embodiment, the e-marketplace 306 communicates a seller profile 432 to procurement application 302, which in response thereto, communicates a vendor profile page 434 to user 402.

In various embodiments, API-4 fetches seller details from e-marketplace 306. API-4 may be called in other instances where a user 402 or a procurement application 302 requests item details. In some embodiments, the call is based on a unique seller identifier. In various embodiments, the identifier may be assigned once to each seller having a vendor profile stored in the cloud and accessible by the system. The seller details may be returned as seller profile information in a vendor profile 432 for sellers. The seller details may include a seller identifier, seller name, and seller metrics.

In various embodiments, the fifth API (API-5) fetches shipping details from the e-marketplace 306. API-5 may be called in other instances where a user 402 or a procurement application 302 requests shipping details. In some embodiments, the call is based on an identifier. In various embodiments, the shipping details may be returned as shipping information in a shipping details page 440. The shipping details may include a shipper, origin address, destination address, shipping number, etc. A user 402 can request an update to the shipping details based on their updated location, for example. API-5 can communicate through the procurement application 302 over to the e-marketplace 306 to request the updated shipping details 436 which are then returned to the procurement application 302 and the end user 402.

Figure 5:
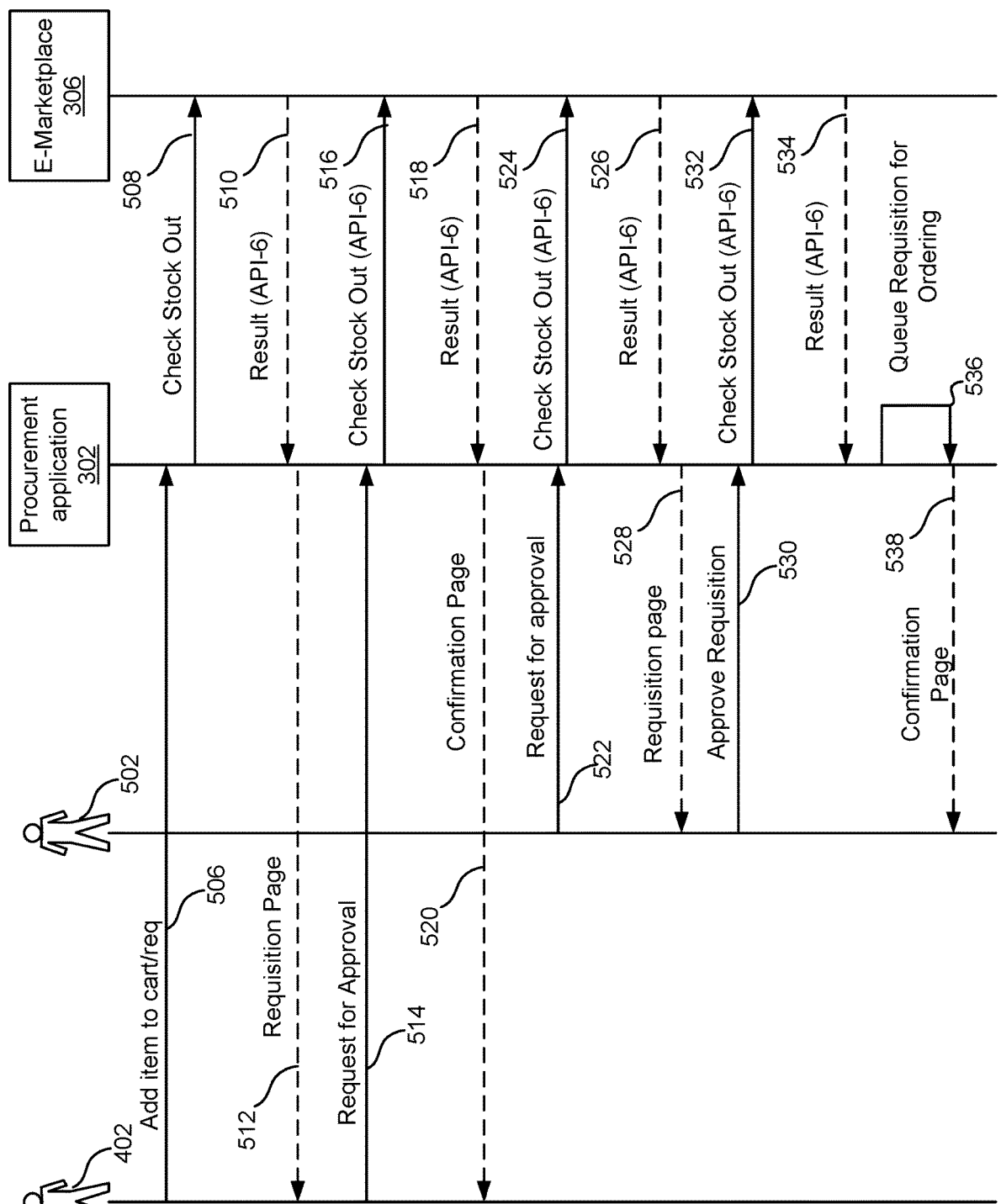
FIG. 5 illustrates a data flow diagram of an example embodiment of a requisitioning process according to the techniques described in the present disclosure.

FIG. 5 illustrates a data flow diagram of an example embodiment of a requisitioning process according to the techniques described in the present disclosure. The requisitioning process 500 includes adding one or more items to the shopping cart (or requisition request) and submitting the requisition for approval. Approval can be configured to be auto-approved or configured to have a professional buyer (in this example, a procurement or purchasing agent 502) as the final approver depending on commodity, amount, etc. For ease of illustration, requisitioning process 500 is described with a agent 502, and that the agent 502 has the last approval in the approval flow. The approval may be automated with rules for approval and learning to adapt to new items. For ease of illustration, requisitioning process 500 is described for a single item purchase, but may be performed with multiple items purchase with a different user interface and multiple requests and results of those described.

In various embodiments, the requisitioning process 500 begins after the procurement application 302 communicates the item details page 426 to user 402 (see FIG. 4), and the user 402 has configured the item (e.g., selected color, size, and the like). In the illustrated embodiment, the user 402 communicates an item to the shopping cart or requisition 506 to the procurement application 302, and in response thereto, the procurement application 302 communicates a check stock request 508 (or a check stock out request) to the e-marketplace 306, which is then configured to execute, for example, a sixth API (API-6), to determine whether the requested item is in stock. In this example, the e-marketplace 306 communicates a result indication 510 to procurement application 302, which in response thereto, communicates a requisition page 512 to user 402.

In various embodiments, API-6 checks whether the requested item in the cart or requisition is in stock from e-marketplace 306. API-6 also may be used to update pricing and shipping information in real time during that process. In the illustrated embodiment, API-6 receives one or more items to check (e.g., referenced by item identifier), the configuration of each item, and offers or discounts that are associated with the item when the item is added to the cart or requisition, and shipping address. The result indication may include an updated item pricing and availability information.

In this example, the user 402 communicates the requisition for approval request 514 to the procurement application 302, and in response thereto, the procurement application 302 communicates a check stock request 516 (or a check stock out request) to e-marketplace 306, which is configured to execute, for example, API-6 to determine whether the requisitioned item is in stock. The e-marketplace 306 can then communicate a result indication 518 to the procurement application 302, which in response thereto, communicates a confirmation page 520 to the user 402. In one embodiment, the result indication 518 can further include shipping costs and other pricing information in real time based on information gathered form the one or more e-marketplaces 306.

At this stage, the agent 502 may review the requisition and determine whether to approve the requisition. In such a case, the agent 502 communicates an access requisition for approval request 522 to the procurement application 302, and in response thereto, the procurement application 302 communicates a check stock request 524 (or a check stock out request) to e-marketplace 306, which is configured to execute, for example, API-6 to determine whether the requisitioned item is in stock. The e-marketplace 306 communicates a result indication 526 to procurement application 302, which in response thereto, communicates a requisition page 528 to agent 502.

In this embodiment, the agent 502 communicates an approval indication 530 to the procurement application 302, and in response thereto, the procurement application 302 communicates a check stock request 532 (or a check stock out request) to e-marketplace 306 that executes, for example, API-6 to determine whether the requisitioned item is in stock. The e-marketplace 306 communicates a result indication 534 to procurement application 302. At this stage, the requisition has been approved. Procurement application 302 can then queue the requisition for ordering at 536.

In the illustrated embodiment, upon completion of the ordering, the procurement application 302 communicates a confirmation page 538 to the agent 502. The confirmation page 538 may be the order confirmation 356 of FIG. 3. In a system with a human agent 502, the approval of the requisition can be asynchronous. Thus, these follow-up stock checks are performed. In a system with an automated approval, these follow-up stock checks may be eliminated.

Figure 6:
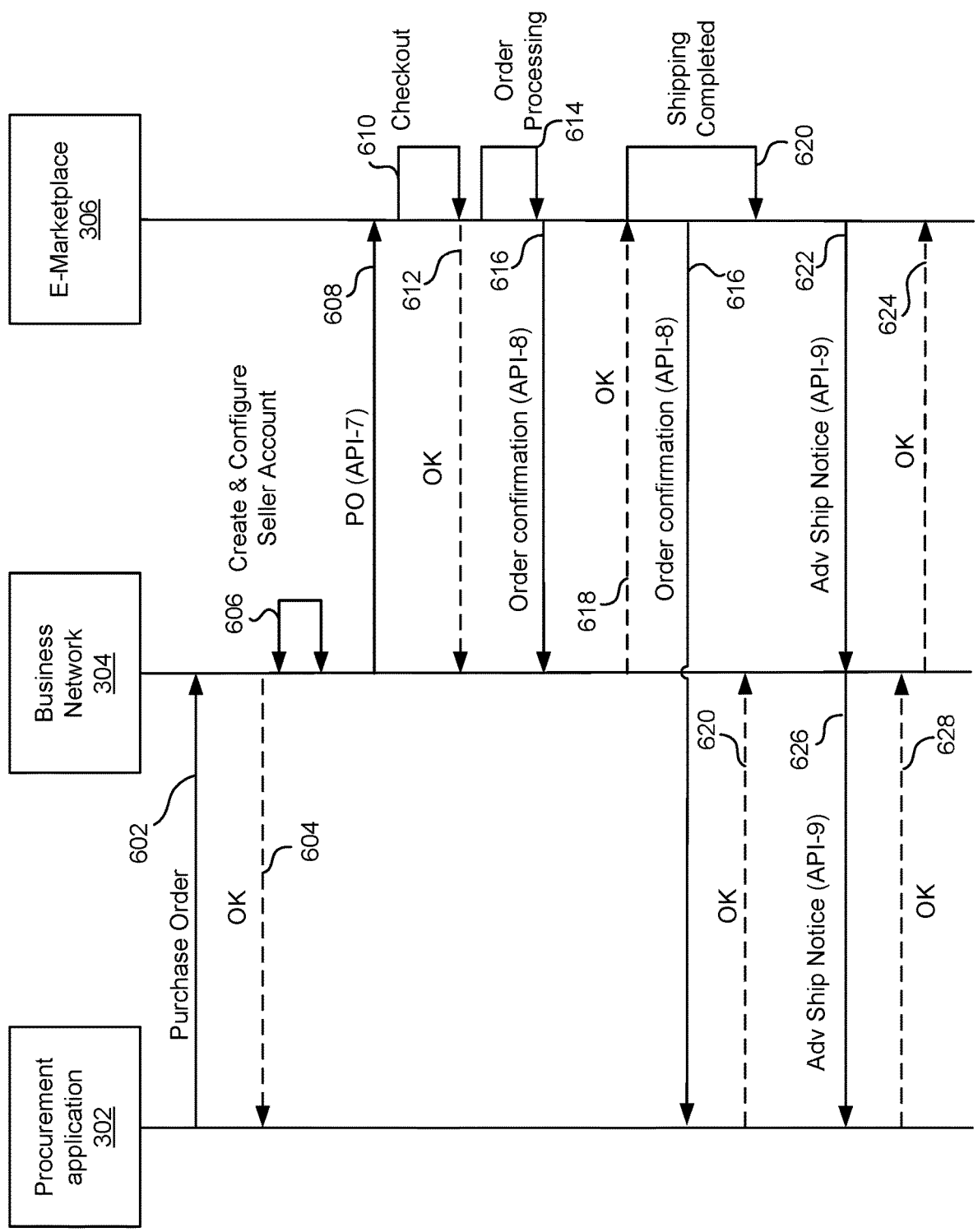
FIG. 6 illustrates a data flow diagram of an example embodiment of a process for order processing according to the techniques described in the present disclosure.

FIG. 6 illustrates a data flow diagram of an example embodiment of a process for order processing according to the techniques described in the present disclosure. After the requisition is approved in the requisition process 500, an order processing operation 600 can be initiated. In the illustrated embodiment, the procurement application 302 first communicates a purchase order 602 to business network 304, which in response thereto, communicates an acknowledgment ("OK") 604 to procurement application 302.

The business network 304 can then create and configure a seller account at 606. As discussed above, a preferred embodiment includes a proxy vendor system integrated with the procurement application 302 and/or the business network 304 that may be configured for simplifying vendor management for client processes by storing vendor master records in the cloud. In the cloud, the vendor master records may be generated once for all users, and when a particular user adds a new vendor, the vendor data (e.g., vendor profile information) associated with that vendor is potentially accessible by any other subsequent user seeking to make a purchase from the same vendor using the system described in this disclosure. A user/customer can purchase from a potentially infinite number of vendors on a spot-buy basis without having to maintain or administer master data for each vendor; and without having to store all of the customer's vendor master records in its own database system. The details of this proxy vendor system are described in FIG. 3B above.

In this example, upon completion of the creation and configuration of the seller account 606 and vendor master records, the business network 304 can communicate a purchase order 608 to the e-marketplace 306, which can be configured to execute, for example, a seventh API (API-7), to request the order. API-7 may comprise an order request, such as a purchase order ("PO"), that the business network 304 routes to e-marketplace 306. In some embodiments, API-7 uses an "OrderRequest" statement in cXML. In various embodiments, an order request document includes the seller that the order is for. The order request document may further include buyer information (e.g., name or shipping address), payment information (e.g., credit card or payment processing system 308), one or more items (e.g., including item identifier, quantity, price, offer details, and the like), and credentials to perform a security check.

In the illustrated embodiment, the e-marketplace 306 performs a checkout process 610, and communicates an acknowledgment ("OK") 612 to the business network 304. Also, in this embodiment the e-marketplace 306 performs the order processing 614, and upon completion, can communicate an order confirmation 616 that is generated, for example, by executing an eight API (API-8). In the depicted embodiment, in response to order confirmation 616, business network 304 communicates an acknowledgment ("OK") 618 to e-marketplace 306.

As discussed previously, the proxy vendor of the spot buy engine can determine how the order is to be routed. The business network 304 can then route the purchase order 602 through a preconfigured supplier account stored in the cloud (or other network) which can determine how to further process and route the purchase order and any further response documents such as 616 and 622.

In the depicted embodiment, the order confirmation 616 can also flow to the procurement application 302, which in response, can communicate an acknowledgment ("OK") 620 to business network 304. The business network 304 may optionally reject the order confirmation based on policies setup by the administrators of the procurement application 302 in their business network account. This can result in an order cancellation on the e-marketplace 306. API-8 may comprise an order confirmation that e-marketplace 306 generates to confirm an order in response to the completion of payment processing. In some embodiments, API-8 uses an "OrderConfirmation" statement in cXML. In some embodiments, the e-marketplace 306 may not communication an order confirmation directly to the user 402. The order confirmation may include items that have been confirmed.

In the illustrated embodiment, the e-marketplace 306 processes acknowledgement 618, including a received shipping completion notification, and provides an advance shipping notice 622 to business network 304, using, for example, an ninth API (API-9). API-9 may comprise an advance shipping notice that the e-marketplace 306 and business network 304 generate to provide buyer information relating to shipping. In some embodiments, API-9 uses an "AdvancedShipNotice" in cXML. In some embodiments, e-marketplace 306 gives higher preference to sellers who provide this information. In some embodiments, e-marketplace 306 may not communicate the advance ship notice directly to the buyer. In some embodiments, the advance shipping notice includes shipping information and tracking numbers.

In response to the advance shipping notice 622, business network 304 can communicate an acknowledgment ("OK") 624 to the e-marketplace 306, and can communicate an advance shipping notice 626 (which may be generated by API-9) to procurement application 302, which in response thereto, can communicate an acknowledgment ("OK") 628 to business network 304. The advance shipping notices 622 and 626 may be the advance shipping notice 358 (see FIG. 3).

Figure 7:
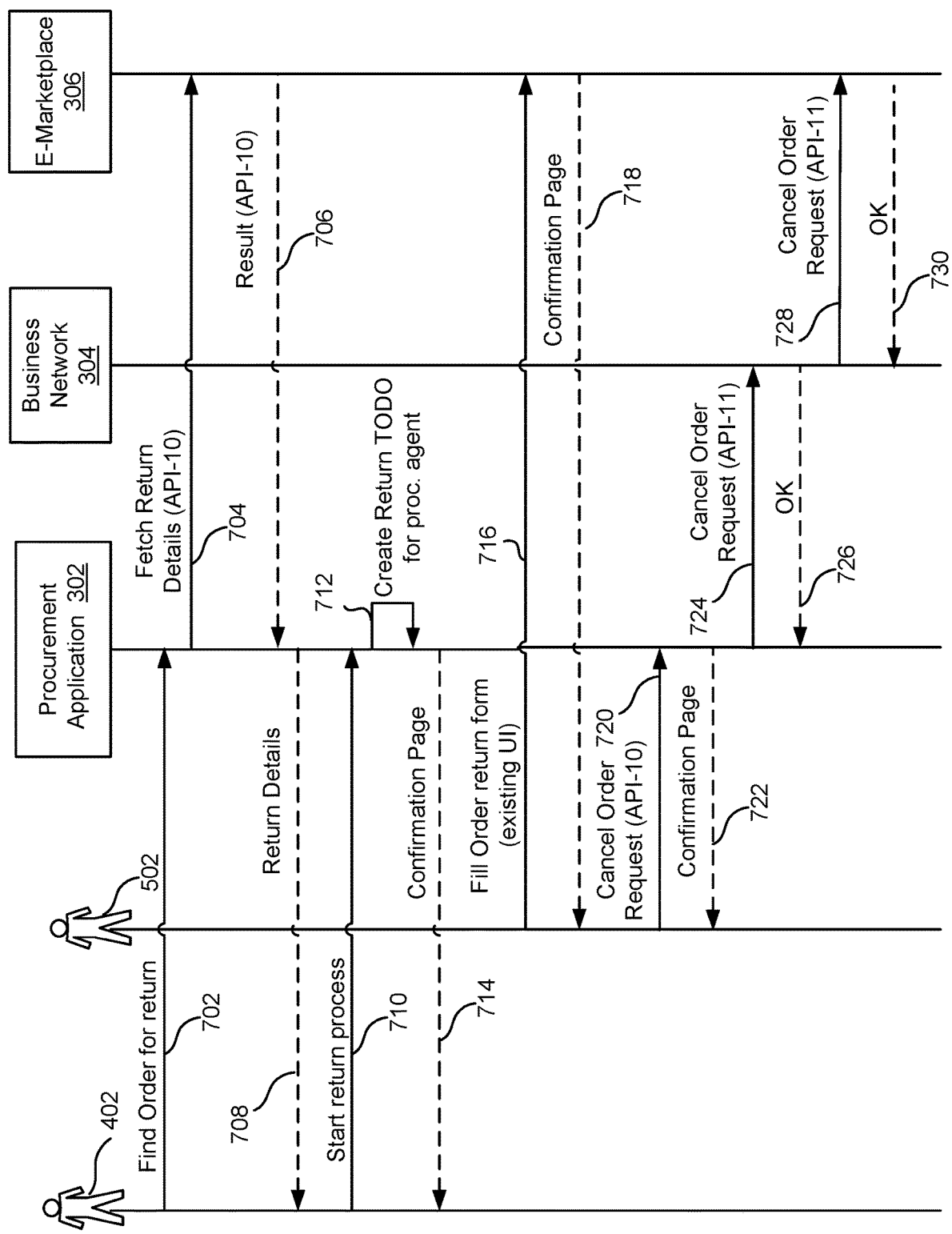
FIG. 7 illustrates a data flow diagram of an example embodiment of a process for return order processing according to the techniques described in the present disclosure.

FIG. 7 illustrates a data flow diagram of an example embodiment of a process for return order processing according to the techniques described in the present disclosure. Return orders, if allowed by the suppliers, may follow the return order processing process 700. In some embodiments, return order processing process 700 starts the return process from the user interface of e-marketplace 306. In some embodiments, users may not be exposed to the user interface because these users do not have access to the buyer's account on the e-marketplace 306.

In the illustrated embodiment, the user 402 searches for an order for an item to return by communicating a find order request for return 702 to procurement application 302, which in response communicates a fetch return details request 704 to e-marketplace 306 by executing, for example, a tenth API (API-10), to fetch the return details. In this example, the-marketplace 306 communicates a result 706 to procurement application 302, by executing, for example, API-10. API-10 may comprise a fetch return details request that procurement application 302 and business network 304 generate to fetch return details for each item in the order.

In response to the result 706, procurement application 302 provides return details 708 to user 402. User 402 provides a start return process 710 to procurement application 302 if user 402 decides to return the item. In response to the start return process 710, procurement application 302 creates a return To Do 712 for agent 502. (This example has a human agent 502). In the depicted example, the procurement application 302 also communicates a confirmation page 714 to user 402. Agent 502 may process the return from a return user interface. Agent 502 communicates a fill order return form 716 to e-marketplace 306, which in response thereto, communicates a confirmation page 718 to the agent 502.

The agent 502 can then communicate a cancel order request 720 to procurement application 302, by executing, for example, an eleventh API (API-11) to cancel the order. API-11 may comprise a cancel order request that agent 502, procurement application 302, and business network 304 may generate to cancel the order process in response to the cancel order request. In some embodiments, API-11 uses a "Order Request" statement in cXML.

The procurement application 302 can then communicate a confirmation page 722 to the agent 502 and can communicate a cancel order request 724 to the procurement application 302, by executing, for example, API-11 to cancel the order. In response, the business network 304 can communicate an acknowledgment ("OK") 726 to procurement application 302 and provide a cancel order request 728 to e-marketplace 306, by executing, for example, API-11 to cancel the order. In response, e-marketplace 306 can provide an acknowledgment ("OK") 730 to business network 304.

II. Exemplary Processes

The following figures depict example flow charts illustrating various embodiments of a process for spot buy purchasing according to the techniques described in this disclosure. It is noted that the processes described below are exemplary in nature and are provided for illustrative purposes and not intended to limit the scope of the disclosure to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 8:
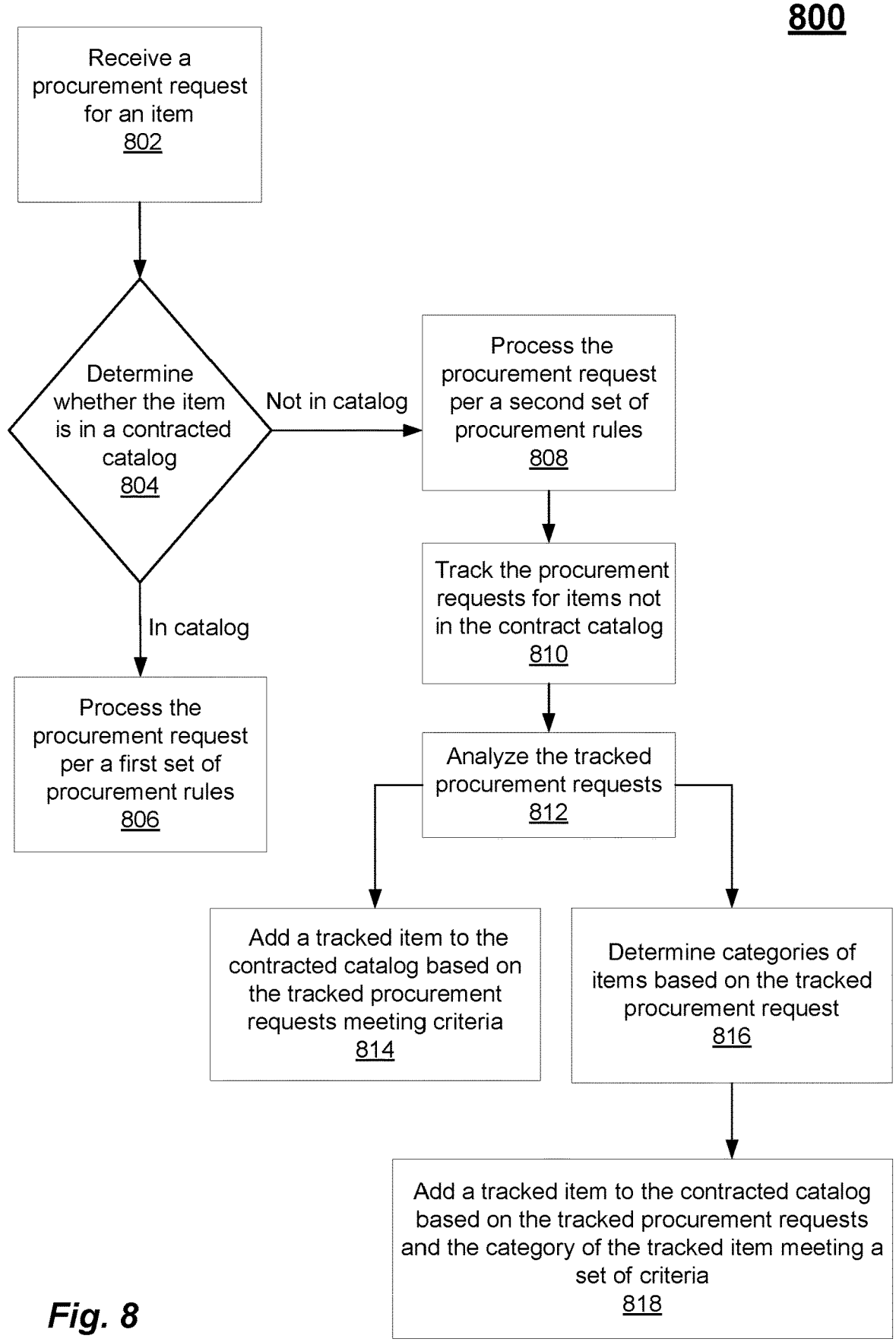
FIG. 8 illustrates a flow chart of an example embodiment of a process for spot buy purchasing according to the techniques described in the present disclosure.

FIG. 8 illustrates a flow chart of an example embodiment of a process for spot buys according to the techniques described in the present disclosure. In the illustrated embodiment, process 800 begins at operation 802 by receiving a request for an item. At 804, the procurement application 302 determines whether the item is in a contracted catalog. If, at 804, the item is in the contract catalog, the procurement application 302 processes, at 806, the request based on a first set of rules. If, on the other hand, the item is not found in the contract catalog, the procurement application 302 processes the request based on a second set of rules for spot buy items.

In this example, at 810, the tracking module 212 tracks the requests for items not found in the contract catalog, and, at 812, analyzes the tracked requests. At 814, the tracking module 212 adds a tracked item to the contracted catalog based on the tracked requests meeting a first set of criteria. At 816, the tracking module 212 determines categories of items based on the tracked request, and, at 818, adds a tracked item to the contracted catalog based on the tracked requests meeting the appropriate criteria.

This completes process 800 according to one example embodiment.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 9:
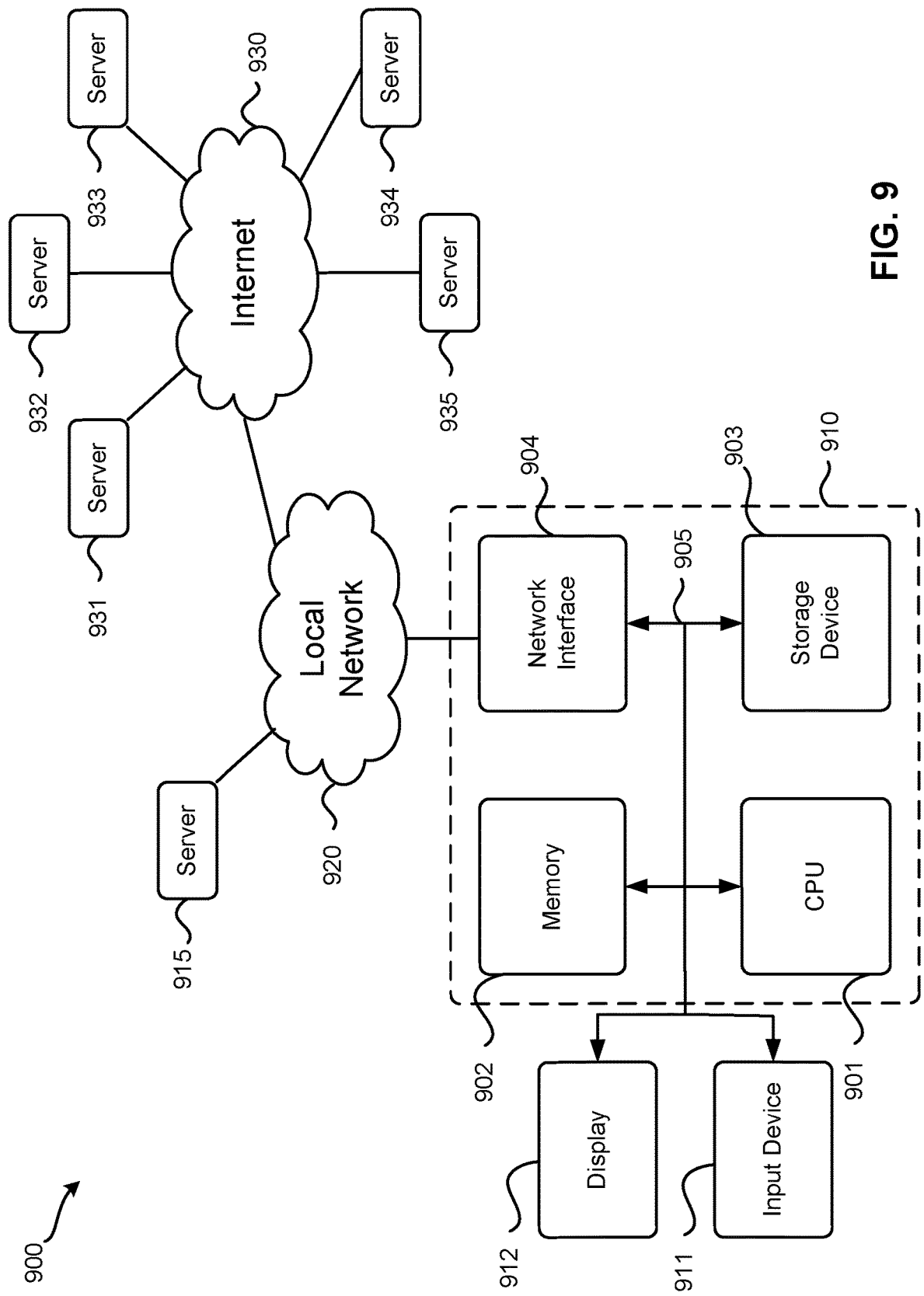
FIG. 9 depicts an example overview block diagram of a data processing system upon which the embodiments described in the present disclosure may be implemented.

FIG. 9 depicts an example overview block diagram of a data processing system upon which the embodiments described herein may be implemented. It is to be understood that a variety of computers configurations may be used to implement the described techniques. While FIG. 9 illustrates various components of a data processing system 900, it is not intended to represent any particular architecture or manner of interconnecting components. It will also be appreciated that network computers and other data processing systems, which have fewer components or additional components, may be used. The data processing system 900 may, for example, comprise a personal computer (PC), workstation, laptop computer, tablet, smartphone or other hand-held wireless device, or any device having similar functionality.

In the illustrated embodiment, data processing system 900 includes a computer system 910. Computer system 910 includes an interconnect bus 905 (or other communication mechanism for communicating information) and one or more processor(s) 901 coupled with the interconnect bus 905 for processing information. Computer system 910 also includes a memory system 902 coupled with the one or more processors 901 via the interconnect bus 905. Memory system 902 is configured to store information and instructions to be executed by processor 901, including information and instructions for performing the techniques described above. This memory system may also be used for storing programs executed by processor(s) 901. Possible implementations of this memory system may be, but are not limited to, random access memory (RAM), read only memory (ROM), or combination thereof.

In the illustrated embodiment, a storage device 903 is also provided for storing information and instructions. Typically storage device 903 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 903 may store source code, binary code, or software files for performing the techniques above. In addition, while FIG. 9 shows that storage device 903 as a local device connected with the components of the data processing system, it will be appreciated by skilled artisans that the described techniques may use a storage device remote from the system, such as a database or other network storage device coupled with the computer system 910 through a network interface such as network interface 904.

Network interface 904 may provide communications between computer system 910 and a network 920. The network interface 904 may be a wireless or wired connection, or any combination thereof. Computer system 910 is configured to send and receive information through the network interface 904 across one or more networks 920 such as a local area network (LAN), wide-area network (WAN), wireless or Bluetooth network, or the Internet 930, etc. Computer system 910 may access data and features on systems residing on one or multiple different hardware servers 931-934 across the network 920. Hardware servers 931-934 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 910 may be coupled via interconnect bus 905 to a display 912 for displaying information to a computer user. An input device 911 such as a keyboard, touchscreen, and/or mouse is coupled to bus 905 for communicating information and command selections from the user to processor 901. The combination of these components allows the user to communicate with the system. In some systems, bus 905 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method comprising:
   in a system in a network including a proxy vendor computer:
   receiving, by the system, a search request for one or more items from a client device, the system having local access to a database storing one or more primary contract based catalogs, wherein the search request is received via a user interface (UI) of an application executing on the client device;
   searching, locally by the system, the database storing the one or more primary contract based catalogs;
   determining that the one or more items are not in the database storing the one or more primary contract based catalogs;
   only in response to determining that the one or more items are not in the database storing the one or more contract based catalogs, executing, by the system, a first application program interface (API) for routing the search request to the proxy vendor computer in the network, the proxy vendor computer is remote from the database storing the one or more primary contract based catalogs;
   conducting, by the proxy vendor computer, a text search of one or more secondary non-contract based catalogs for one or more e-commerce marketplaces, wherein each of the one or more e-commerce marketplaces hosts items offered by a plurality of suppliers;
   transmitting, by the system, one or more search results to the client device for display on the UI, the one or more search results comprising the one or more items of the search request, the one or more items corresponding to one or more vendor master records associated with at least one of the plurality of suppliers, the one or more items in the search request having a matching entry in the secondary non-contract based catalog of at least one of the e-commerce marketplaces; and
   responsive at least to the one or more items associated with the at least one of the e-commerce marketplaces being purchased, storing, by the proxy vendor computer in one or more databases associated with the proxy vendor computer, the one or more vendor master records associated with the at least one of the plurality of suppliers of the one or more e-commerce marketplaces when said one or more vendor master records are new vendor master records so that products or services associated with the new vendor master records are accessible in subsequent searches by a plurality of users,
   wherein the one or more vendor master records stored by the proxy vendor computer in the one or more databases are accessible by client devices in communication with the system,
   wherein the one or more search results are transmitted to the client device for display on the UI without redirecting the application to a page associated with the one or more e-commerce marketplaces.

2. The method of claim 1 further comprising:
   tracking the search requests for items not in the database storing the one or more primary contract based catalogs;
   analyzing the tracked search requests;
   determining categories of items based on the tracked search request; and
   adding a tracked item to a primary catalog based on the tracked search requests meeting a first set of criteria.

3. The method of claim 1 further comprising:
   receiving, by the system, an additional search request for the one or more items from an additional client device;
   determining that the one or more items are not in the database storing the one or more primary contract based catalogs;
   routing the additional search request to the proxy vendor computer in the network;
   performing the search request on the one or more databases associated with the proxy vendor computer and not the one or more secondary non-contract based catalogs for the one or more e-commerce marketplaces;

transmitting additional one or more search results comprising the one or more items of the additional search request to the additional client device.

4. The method of 1 wherein the proxy vendor computer manages routing and processing of the search request when the one or more requested items are not in the one or more primary catalogs.

5. The method of claim 1 wherein the proxy vendor computer is configured to transform search requests for spot buys into requests compatible with the one or more e-commerce marketplaces.

6. The method of claim 1 further comprising:

determining, prior to said transmitting the one or more search results, whether the one or more search results satisfy one or more rules set by an enterprise with which the client device is associated.

7. The method of claim 6 wherein the vendor master records are accessible in the network for spot buy purchasing without having to maintain or administer the vendor master records for each vendor at the client devices.

8. A non-transitory computer readable storage medium having programmed computer code stored thereon, which when executed by a computer system, causes the computer system to perform operations comprising:

receiving a search request for one or more items from a client device at a system in a network, the system including a proxy vendor computer, the system having local access to a database storing one or more primary contract based catalogs, wherein the search request is received via a user interface (UI) of an application executing on the client device;

searching, locally by the system, the database storing the one or more primary contract based catalogs;

determining that the one or more items are not in the database storing the one or more primary contract based catalogs;

only in response to determining that the one or more items are not in the database storing the one or more contract based catalogs, executing, by the system, a first application program interface (API) for routing the search request to the proxy vendor computer in the network, the proxy vendor computer is remote from the database storing the one or more primary contract based catalogs;

conducting, by the proxy vendor computer, a text search of one or more secondary non-contract based catalogs for one or more e-commerce marketplaces, wherein each of the one or more e-commerce marketplaces hosts items offered by a plurality of suppliers;

transmitting, by the system, one or more search results to the client device for display on the UI, the one or more search results comprising the one or more items of the search request, the one or more items corresponding to one or more vendor master records associated with at least one of the plurality of suppliers, the one or more items in the search request having a matching entry in the secondary non-contract based catalog of at least one of the e-commerce marketplaces; and responsive at least to the one or more items associated with the at least one of the e-commerce marketplaces being purchased, storing, by the proxy vendor computer in one or more databases associated with the proxy vendor computer, the one or more vendor master records associated with the at least one of the plurality of suppliers of the one or more e-commerce marketplaces when said one or more second vendor master records are new vendor master records so that products or services associated with the new vendor master records are accessible in subsequent searches by a plurality of users, wherein the one or more vendor master records stored by the proxy vendor computer in the one or more databases are accessible by client devices in communication with the system, wherein the one or more search results are transmitted to the client device for display on the UI without redirecting the application to a page associated with the one or more e-commerce marketplaces.

9. The computer readable storage medium of claim 8, wherein the programmed computer code causes the computer system to further perform operations comprising:

receiving, by the system, an additional search request for the one or more items from an additional client device;

determining that the one or more items are not in the database storing the one or more primary contract based catalogs;

routing the additional search request to the proxy vendor computer in the network;

performing the search request on the one or more databases associated with the proxy vendor computer and not the one or more secondary non-contract based catalogs for the one or more e-commerce marketplaces;

transmitting additional one or more search results comprising the one or more items of the additional search request to the additional client device.

10. The computer readable storage medium of claim 8 wherein the proxy vendor computer manages routing and processing of the search request when the requested item is not in the one or more primary catalogs.

11. The computer readable storage medium of claim 8 wherein the proxy vendor computer is configured to transform search requests for spot buys into requests compatible with the one or more e-commerce marketplaces.

12. The computer readable storage medium of claim 8, wherein the programmed computer code causes the computer system to further perform operations comprising:

determining, prior to said transmitting the one or more search results, whether the one or more search results satisfy one or more rules set by an enterprise with which the client device is associated.

13. The computer readable storage medium of claim 12 wherein the vendor master records are accessible in the network for spot buy purchasing without having to maintain or administer the vendor master records for each vendor at the client devices.

14. A system comprising:

a network comprising a proxy vendor computer and comprising at least one processor and a memory configured to store programmed computer code, which when executed by the processor, causes the processor to perform operations comprising:

receiving, by the system, a search request for one or more items from a client device, the system having local access to a database storing one or more primary contract based catalogs, wherein the search request is received via a user interface (UI) of an application executing on the client device;

searching, locally by the system, the database storing the one or more primary contract based catalogs;

determining that the one or more items are not in the database storing the one or more primary contract based catalogs;

only in response to determining that one or more items are not in the database storing the one or more contract based catalogs, executing, by the system, a first application program interface (API) for routing the search request to the proxy vendor computer in the network, the proxy vendor computer is remote from the database storing the one or more primary contract based catalogs;

conducting, by the proxy vendor computer, a text search of one or more secondary non-contract based catalogs for one or more e-commerce marketplaces, wherein each of the one or more e-commerce marketplaces hosts items offered by a plurality of suppliers; and transmitting, by the system, one or more search results to the client device for display on the UI, the one or more search results comprising the one or more items of the search request, the one or more items corresponding to one or more vendor master records associated with at least one of the plurality of suppliers, the one or more items in the search request having a matching entry in the secondary non-contract based catalog of at least one of the e-commerce marketplaces; and responsive at least to the one or more items associated with the at least one of the e-commerce marketplaces being purchased, storing, by the proxy vendor computer in one or more databases associated with the proxy vendor computer, the one or more vendor master records associated with the at least one of the plurality of suppliers of the one or more e-commerce marketplaces when said one or more vendor master records are new vendor master records so that products or services associated with the new vendor master records are accessible in subsequent searches by a plurality of users, wherein the one or more vendor master records are stored by the proxy vendor computer in the one or more databases are accessible by client devices in communication with the system, wherein the one or more search results are transmitted to the client device for display on the UI without redirecting the application to a page associated with the one or more e-commerce marketplaces.

15. The system of claim 14, wherein the programmed computer code causes the processor to further perform operations comprising:
receiving, by the system, an additional search request for the one or more items from an additional client device;
determining that the one or more items are not in the database storing the one or more primary contract based catalogs;
routing the additional search request to the proxy vendor computer in the network;
performing the search request on the one or more databases associated with the proxy vendor computer and not the one or more secondary non-contract based catalogs for the one or more e-commerce marketplaces;
transmitting additional one or more search results comprising the one or more items of the additional search request to the additional client device.

16. The system of claim 14 wherein the proxy vendor computer is configured to manage routing and processing of the search request when the requested item is not in the one or more primary catalogs.

17. The system of claim 14 wherein the proxy vendor computer is configured to transform search requests for spot buys into requests compatible with one or more e-commerce marketplaces.

18. The system of claim 14, wherein the programmed computer code causes the processor to further perform operations comprising:
determining, prior to said transmitting the one or more search results, whether the one or more search results satisfy one or more rules set by an enterprise with which the client device is associated.

19. The non-transitory computer readable storage medium of claim 8, wherein the programmed computer code causes the computer system to further perform operations comprising:
tracking the search requests for items not in the database storing the one or more primary contract based catalogs;
analyzing the tracked search requests;
determining categories of items based on the tracked search request; and
adding a tracked item to a primary catalog based on the tracked search requests meeting a first set of criteria.

20. The system of claim 14, wherein the programmed computer code causes the processor to further perform operations comprising:
tracking the search requests for items not in the database storing the one or more primary contract based catalogs;
analyzing the tracked search requests;
determining categories of items based on the tracked search request; and
adding a tracked item to a primary catalog based on the tracked search requests meeting a first set of criteria.

21. The system of claim 14, wherein the vendor master records are accessible in the network for spot buy purchasing without having to maintain or administer the vendor master records for each vendor at the client devices.

* * * * *